United States Patent
Gou et al.

[19]

[11] Patent Number: 6,160,864
[45] Date of Patent: Dec. 12, 2000

[54] SEISMIC ISOLATORS

[75] Inventors: Perng-Fei Gou, Saratoga; Enrique Rafael Solorzano, San Jose, both of Calif.; Giancarlo Barbanti, Sirtori, Italy

[73] Assignee: General Electric Company, Schenectady, N.Y.

[21] Appl. No.: 09/264,227

[22] Filed: Mar. 5, 1999

[51] Int. Cl.⁷ ........................ G21C 13/024; G21C 13/04
[52] U.S. Cl. ..................... 376/285; 376/293; 376/461; 52/167.4; 52/167.8
[58] Field of Search .................... 376/285, 293, 376/294, 461; 52/167.1–167.9

[56] References Cited

U.S. PATENT DOCUMENTS

| | | | |
|---|---|---|---|
| 4,474,729 | 10/1984 | Schoening et al. | 376/461 |
| 4,527,365 | 7/1985 | Yoshizawa et al. | 52/67 |
| 4,599,834 | 7/1986 | Fujimoto et al. | 52/167 |
| 4,910,930 | 3/1990 | Way | 52/167 R |
| 4,938,633 | 7/1990 | Wu et al. | 405/229 |
| 4,978,581 | 12/1990 | Fukahori et al. | 428/492 |
| 5,161,338 | 11/1992 | Tada | 52/167 |
| 5,204,054 | 4/1993 | Townsend et al. | 376/296 |
| 5,490,356 | 2/1996 | Kemeny | 52/167.7 |
| 5,544,210 | 8/1996 | Wedellsborg | 376/294 |
| 5,740,216 | 4/1998 | Morishita | 376/285 |
| 5,915,508 | 6/1999 | Lai | 188/379 |

FOREIGN PATENT DOCUMENTS

| | | |
|---|---|---|
| 2085891 | 10/1985 | Japan . |
| 2095496 | 10/1985 | Japan . |

Primary Examiner—Michael J. Carone
Assistant Examiner—Yongtack K. Mun
Attorney, Agent, or Firm—Armstrong Teasdale LLP

[57] ABSTRACT

A seismic load suppressing system for a nuclear reactor that reduces the seismic input to the reactor and the internal components of the reactor including the fuel is described. The seismic load suppressing system includes, in one embodiment, a plurality of seismic isolators positioned circumferentially between the reactor pedestal and a lower pedestal and a plurality of displacement limiters coupled to a lower pedestal skirt and positioned adjacent the reactor pedestal. The seismic isolators include a plurality of alternating layers of a resilient material and steel plates bonded together. Each displacement limiter includes a cantilever beam. The beam includes a beam core and two steel plates laminated on opposing outer surfaces of the beam core. The steel plates are fabricated from carbon steel having a lower yield strength than the beam core.

17 Claims, 3 Drawing Sheets

SEISMIC ISOLATORS

BACKGROUND OF THE INVENTION

This invention relates generally to nuclear reactors and more particularly, to a seismic load suppressing system that includes seismic isolators and displacement limiters.

In at least some known nuclear reactor power plants, the reactor vessel is supported by a substantially stiff pedestal. The pedestal is in turn supported by the reactor building basemat which rests below ground and may rest on bedrock. As a consequence of this arrangement, the fundamental frequency of the assembly including the reactor and the reactor pedestal is approximately 4 hertz (Hz). The fundamental frequency of 4 Hz is in an intense frequency region of earthquake excitation, making the assembly susceptible to seismic motion. The plant design parameter Safe Shut-down Earthquake (SSE) typically has a value of 0.3 g, i.e., 0.3 times the gravitational acceleration, for a standard nuclear power plant (g=9.81 meters/second squared). At an SSE equal to 0.3 g, the safety related equipment can be shut down and survive when forces of 0.3 g are encountered by the plant. At sites where forces in excess of 0.3 g are anticipated, the standard plant design needs to be modified to accommodate the higher seismic forces. One problem that must be addressed in the design of the plant is that the response to a seismic input of the reactor internal components, including the fuel, will generally be magnified. For example a seismic input of 0.3 g may result in a response by the fuel in the reactor of 0.9 g.

It would be desirable to provide a nuclear reactor that can filter out high seismic excitations to allow for a standard plant design to be site independent and to lower the response of reactor internal components, including the fuel.

BRIEF SUMMARY OF THE INVENTION

These and other objects may be attained by a seismic load suppressing system for a nuclear reactor that reduces the seismic input to the reactor and the internal components of the reactor including the fuel. The seismic load suppressing system includes, in one embodiment, a plurality of seismic isolators and a plurality of displacement limiters. The seismic isolators are positioned circumferentially between the reactor pedestal and a lower pedestal that rests on the reactor building basemat. The displacement limiters are coupled to a lower pedestal skirt and positioned adjacent the reactor pedestal.

The seismic isolators include a plurality of alternating layers of a resilient material and steel plates bonded together. The seismic isolators may be any diameter, but typically, each seismic isolator has a diameter of about 400 millimeters to about 1 meter. Additionally, the resilient material is typically rubber or neoprene.

Each displacement limiter includes a cantilever beam. The beam is attached at one end to the lower pedestal skirt and extends to a position adjacent the lower end of the reactor pedestal. The beam includes a beam core and two steel plates laminated on opposing outer surfaces of the beam core. The steel plates are fabricated from carbon steel having a lower yield strength than the beam core. For example, the beam core may be fabricated from high strength steel having a yield strength of at least about 60,000 pounds per square inch.

In operation, the plurality of seismic isolators dampen any seismic input into the structure supported by the seismic isolators. The dampening is due to the unique construction of alternating layers of resilient material and steel plates bonded together. However, because of the relatively low horizontal stiffness of the seismic isolators, the displacement limiters are used to prevent large lateral displacements caused by a seismic input. A dampening effect is generated by energy displacement due to plastic deformation of the face cladding plates of the cantilever beams of the displacement limiters. Additional energy is dissipated through the friction between the contact of the upper pedestal portion and the top face of the cantilever beams of the displacement limiters.

The above described seismic isolators and displacement limiters filter out high seismic excitations which lowers the response of reactor internal components, including the fuel. Lowering the response to seismic input of the reactor and reactor internal components permits a standardized plant with a design that is site independent.

DETAILED DESCRIPTION OF THE INVENTION

Figure 1:
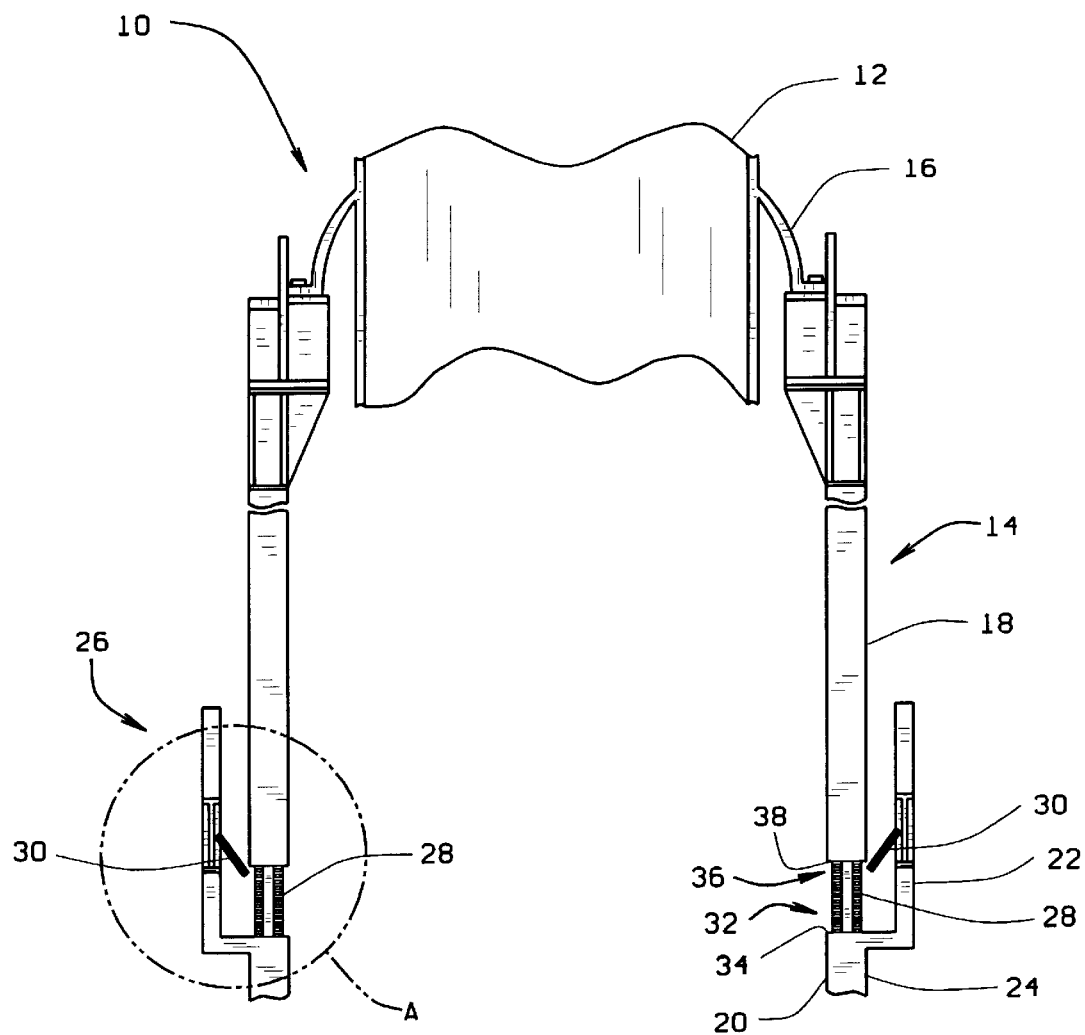
FIG. 1 is a sectional side view, with parts cut away, of a lower portion of a nuclear reactor in accordance with one embodiment of the present invention.

FIG. 1 is a sectional side view, with parts cut away, of a portion of a nuclear reactor 10 in accordance with one embodiment of the present invention. Nuclear reactor 10 includes a reactor pressure vessel (RPV) 12 supported by a reactor pedestal 14. RPV 12 is coupled to reactor pedestal 14 by a reactor skirt 16. Reactor pedestal 14 includes an upper reactor pedestal portion 18 and a lower reactor pedestal portion 20. Lower portion 20 is supported by the reactor building basemat (not shown) which rests below ground and may rest on bedrock A pedestal skirt 22 extends upward from an outer side 24 of lower pedestal portion 20. It should be understood that nuclear reactor 10 also includes other components not shown in FIG. 1. For example, nuclear reactor 10 also includes a fuel assembly, a shroud, a steam separator, a dryer, and control rods (all not shown).

Reactor 10 includes a seismic load suppressing system 26. Seismic load suppressing system 26 includes a plurality of seismic isolators 28 located circumferentially around reactor pedestal 14 and a plurality of displacement limiters 30 located circumferentially around, and coupled to pedestal skirt 22. Particularly, seismic isolators 28 are positioned between lower reactor pedestal portion 20 and upper pedestal portion 18. A first end 32 of each seismic isolator 28 is coupled to a top surface 34 of lower pedestal portion 20, and a second end 36 of each seismic isolator 28 is coupled to a bottom surface 38 of upper pedestal portion 18.

Figure 2:
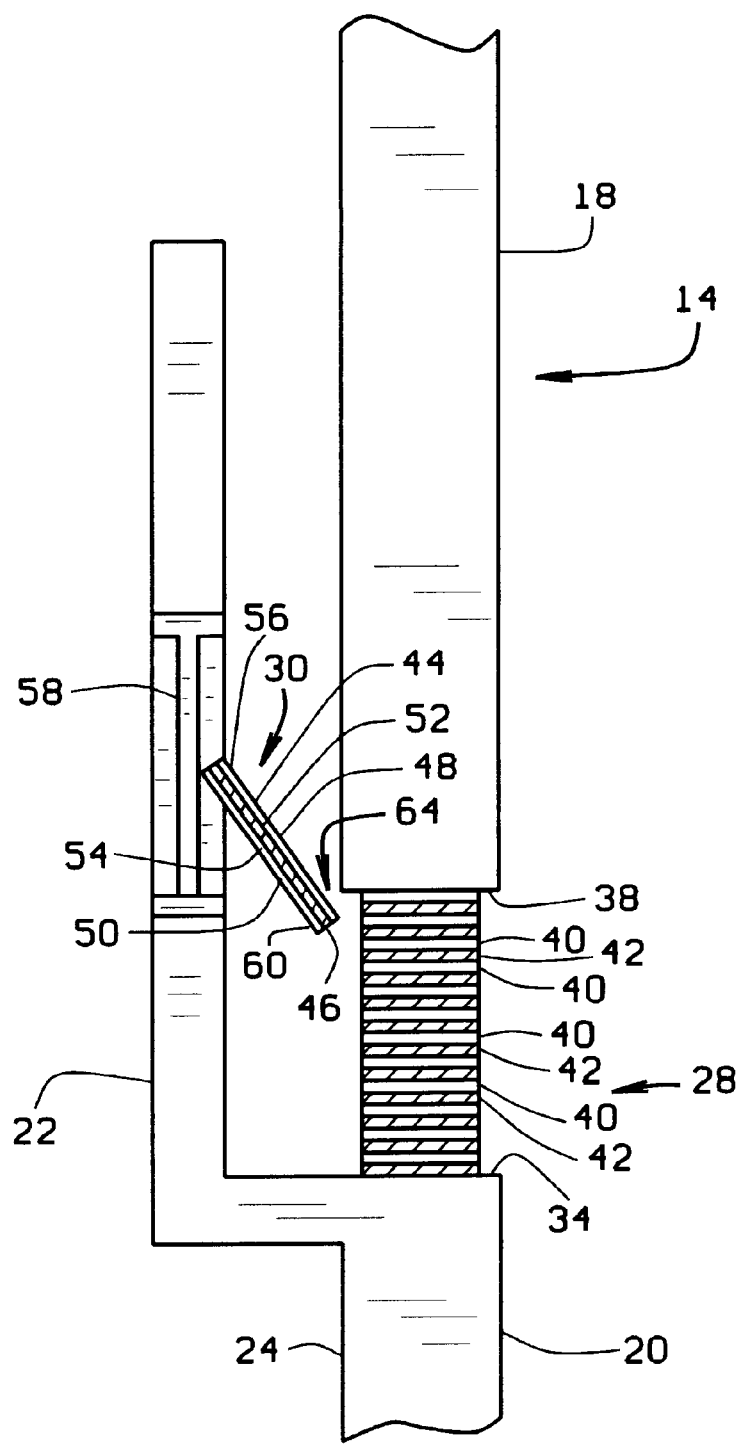
FIG. 2 is an enlargement of a portion A of the nuclear reactor portion shown in FIG. 1.

Referring to FIG. 2, each seismic isolator 28 includes alternating layers of a resilient material 40 and steel plates 42 bonded together. Seismic isolators 28 may be any diameter, but typically, each seismic isolator 28 has a diameter of about 400 millimeters to about 1 meter. In an alternate embodiment, each seismic isolator 28 has a diameter of about 400 millimeters to about 600 millimeters. Additionally, based on the diameter, the thickness of the alternating layers and the number of layers, each seismic isolator 28 has stiffness in the horizontal direction. For example a typical horizontal stiffness may be about 1.25 tons-force per centimeter(tonf/cm). This means that 1.25 tons-force are needed to displace isolator 28 one centimeter in the horizontal direction. Each seismic isolator also has a stiffness in the vertical direction. A typical value of horizontal stiffness is about 2000 tonf/cm. Additionally, the thickness of each steel plate 42 and each resilient material layer 40 is about 1 to about 3 millimeters. Resilient material layer 40 may be any suitable resilient material. Preferably, resilient material layer 40 is rubber or neoprene.

Each displacement limiter 30 includes a cantilever beam 44. Cantilever beam 44 includes a beam core 46 and two steel plates 48 and 50 laminated on opposing outer surfaces 52 and 54 of the beam core 46 respectively. Steel plates 48 and 50 are fabricated from carbon steel having a lower yield strength than the steel used to fabricate beam core 46. In one embodiment, beam core 46 is fabricated from high strength steel having a yield strength of at least about 60,000 pounds per square inch (psi). In one embodiment, steel plates 48 and 50 are fabricated from A-36 carbon steel having a yield strength of 36,000 psi, and beam core 46 is fabricated from A-572 Grade 60 high strength steel having a yield strength of 60,000 psi.

Displacement limiters 30 are coupled at a first end 56 to pedestal skirt 22. Particularly, pedestal skirt 22 includes a connecting portion 58. In one embodiment, connecting portion 58 is a steel I-beam and pedestal skirt 22 is fabricated from reinforced concrete. In alternative embodiments, pedestal skirt 22 may be fabricated from steel and connecting portion 58 is an integral portion of steel pedestal skirt 22. Displacement limiters 30 may be welded or bolted to connecting portion 58. Displacement limiters 30 are positioned to extend at an angle from connecting portion 58 so that a second end 60 is positioned near to bottom surface 38 of upper reactor pedestal 18.

Figure 3:
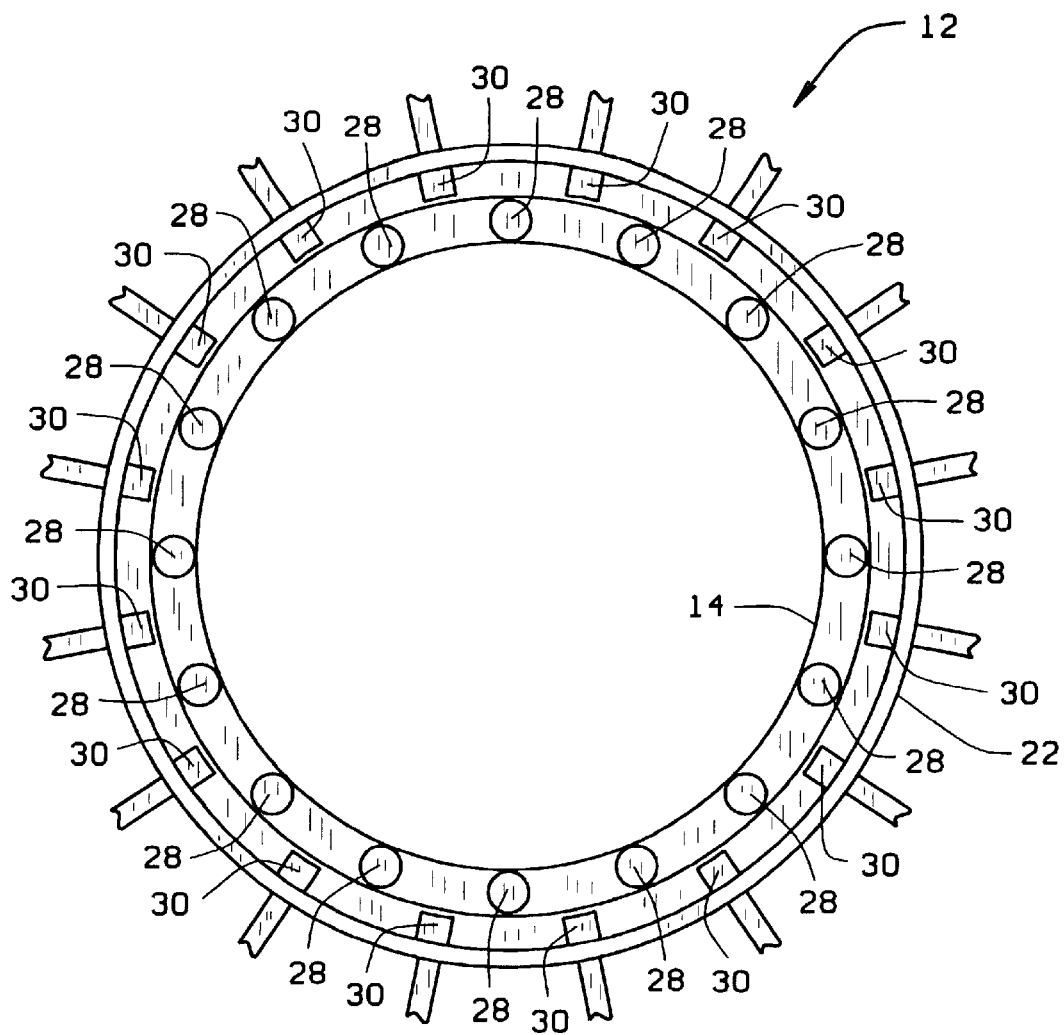
FIG. 3 is a sectional top view of the nuclear reactor portion shown in FIG. 1.

FIG. 3 is a sectional top view of nuclear reactor pressure vessel 12 showing sixteen seismic isolators 28 located circumferentially around reactor pedestal 14 and sixteen displacement limiters 30 located circumferentially around pedestal skirt 22 and adjacent to reactor pedestal 14. Of course, other embodiments may include more or less than sixteen seismic isolators 28 and sixteen displacement limiters 30.

Displacement limiters 30 prevent large lateral displacements in a seismic event. A dampening effect is generated by energy dissipation due to plastic deformation of steel plates 48 and 50. When the lateral displacement of reactor pedestal 14 is large enough to engage displacement limiters 30, additional energy is dissipated through the friction between the contact of upper reactor pedestal 18 with steel plate 48 of cantilever beam 44. Displacement limiters 30 are configured so that there is a predetermined gap 64 (see FIG. 2) between reactor pedestal 14 and each displacement limiter 30. Gap 64 is sized to limit the deflection of pedestal 14 to be equal to or less than that of the parts of reactor 10 that are not supported by seismic isolators 28. For example, small seismic loading caused by low intensity seismic forces produce small lateral displacements that do not cause reactor pedestal 14 to engage displacement limiters 30. In contrast, high seismic loading produces lateral displacement of pedestal 14 that may cause pedestal 14 to engage one or more displacement limiters 30. The movement of reactor vessel 12 decreases as more displacement limiters are engaged. Without displacement limiters 30, piping connected to reactor vessel 12 may be subject to imposed displacement through the reactor vessel nozzles (not shown), when reactor pressure vessel 12 is supported by seismic isolators 28.

Seismic isolators 28 dampen the seismic input to reactor vessel 12 and the reactor internals (not shown). For example, a seismic input of 0.3 g peak ground acceleration typically produces a response of the fuel in reactor vessel 12 of about 0.9 g, if there were no seismic isolators 28 supporting reactor vessel 12 and it is assumed that the total weight of reactor vessel 12, reactor skirt 16 and upper reactor pedestal 14 is about 2000 tons. However, with seismic isolator supporting upper reactor pedestal 14, the response of the fuel is reduced to about 0.29 g, which is within acceptable reactor design parameters.

The above described seismic load suppressing system 26, including seismic isolators 28 and displacement limiters 30, filters out high seismic excitations which lowers the response of reactor 10 internal components, including the fuel. By lowering the response to seismic input of reactor 10 and reactor internal components permits a standardized plant design to be developed which is site independent.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A seismic load suppressing system for a nuclear reactor comprising:

a plurality of seismic isolators; and a plurality of displacement limiters, each said displacement limiter comprises a cantilever beam comprising a beam core, a first steel plate laminated to a first surface of said beam core, and a second steel plate laminated to a second surface of said beam core, said second surface opposed to said first surface.

2. A seismic load suppressing system in accordance with claim 1 wherein each said seismic isolator comprises a plurality of layers, said plurality of layers comprising alternating layers of resilient material and steel plates bonded together.

3. A seismic load suppressing system in accordance with claim 2 wherein said resilient material comprises rubber or neoprene.

4. A seismic load suppressing system in accordance with claim 3 wherein said seismic isolator has a horizontal stiffness of 1.25 tons-force per centimeter.

5. A seismic load suppressing system in accordance with claim 4 wherein said seismic isolator has a diameter of about 400 millimeters to 1 meter.

6. A seismic load suppressing system in accordance with claim 3 wherein said seismic isolator has a diameter of about 400 millimeters to 600 millimeters.

7. A seismic load suppressing system in accordance with claim 1 wherein said first and second steel plates are comprised of carbon steel having a yield strength that is lower than the yield strength of said beam core.

8. A seismic load suppressing system in accordance with claim 7 wherein said beam core comprises high strength steel having a yield strength of at least about 60,000 pounds per square inch.

9. A nuclear reactor comprising:

a reactor pressure vessel;

a reactor pedestal, said reactor pressure vessel supported by said reactor pedestal, said reactor pressure vessel coupled to a first end of said reactor pedestal;

a seismic load suppressing system located at a second end of said reactor pedestal, said reactor pedestal coupled to and supported by said seismic load suppressing system; and a lower pedestal, said seismic load suppressing system coupled to and supported by said lower pedestal, said seismic load suppressing system comprising:

a plurality of seismic isolators; and a plurality of displacement limiters, each said displacement limiter comprises a cantilever beam comprising a beam core, a first steel plate laminated to a first surface of said beam core, and a second steel plate laminated to a second surface of said beam core, said second surface opposed to said first surface.

10. A nuclear reactor in accordance with claim 9 wherein each said seismic isolator comprises a plurality of layers, said plurality of layers comprising alternating layers of resilient material and steel plates bonded together.

11. A nuclear reactor in accordance with claim 10 wherein said resilient material comprises rubber or neoprene.

12. A nuclear reactor in accordance with claim 11 wherein said seismic isolator has a horizontal stiffness of 1.25 tons-force per centimeter.

13. A nuclear reactor in accordance with claim 10 wherein said seismic isolator has a diameter of about 400 millimeters to 1 meter.

14. A nuclear reactor in accordance with claim 13 wherein each said seismic isolator is located between and coupled to said reactor pedestal and said lower pedestal.

15. A nuclear reactor in accordance with claim 9 wherein said first and second steel plates are comprised of carbon steel having a yield strength that is lower than the yield strength of said beam core.

16. A nuclear reactor in accordance with claim 15 wherein said beam core comprises high strength steel having a yield strength of at least about 60,000 pounds per square inch.

17. A nuclear reactor in accordance with claim 16 wherein said lower pedestal comprises a skirt extending upward from an outer side of said lower pedestal, and each said displacement limiter is coupled at a first end to said lower pedestal skirt, a second end of each said displacement limiter positioned adjacent a lower end of said reactor pedestal.

* * * * *